United States Patent
Maier et al.

(10) Patent No.: US 8,090,180 B2
(45) Date of Patent: Jan. 3, 2012

(54) METHOD FOR SEGMENTING IMAGE DATA FOR DETECTING A LIVER

(75) Inventors: Florian Maier, Schuttertal (DE); Grzegorz Soza, Nürnberg (DE); Andreas Wimmer, Ansbach (DE)

(73) Assignee: Siemens Aktiengesellschaft, Munich (DE)

( * ) Notice: Subject to any disclaimer, the term of this patent is extended or adjusted under 35 U.S.C. 154(b) by 832 days.

(21) Appl. No.: 12/213,046

(22) Filed: Jun. 13, 2008

(65) Prior Publication Data
US 2009/0003672 A1 Jan. 1, 2009

(30) Foreign Application Priority Data
Jun. 15, 2007 (DE) .......................... 10 2007 028 270

(51) Int. Cl.
G06K 9/00 (2006.01)
(52) U.S. Cl. ........................ 382/131; 600/443
(58) Field of Classification Search .......... 382/128–132, 382/154; 600/443–446
See application file for complete search history.

(56) References Cited

U.S. PATENT DOCUMENTS

| | | | |
|---|---|---|---|
| 2002/0181754 A1* | 12/2002 | Masumoto et al. | 382/131 |
| 2005/0078857 A1* | 4/2005 | Park | 382/128 |
| 2005/0232474 A1* | 10/2005 | Wei et al. | 382/128 |
| 2005/0238215 A1* | 10/2005 | Jolly et al. | 382/128 |
| 2006/0147126 A1 | 7/2006 | Grady | |
| 2007/0025616 A1 | 2/2007 | Grady et al. | |
| 2007/0081710 A1 | 4/2007 | Hong et al. | |
| 2008/0091102 A1* | 4/2008 | Maeda et al. | 600/436 |
| 2008/0292153 A1* | 11/2008 | Binnig et al. | 382/128 |
| 2009/0052756 A1* | 2/2009 | Saddi et al. | 382/131 |
| 2009/0080779 A1* | 3/2009 | Chefd'hotel et al. | 382/209 |

FOREIGN PATENT DOCUMENTS

| | | |
|---|---|---|
| DE | 102006047373 A1 | 5/2007 |
| EP | 1750226 A2 | 2/2007 |

OTHER PUBLICATIONS

Grady et al.; Random walks for image segmentation, Grady et al., IEEE Transactions on Pattern Analysis and Machine Intelligence 28(11) (2006) 1768-1783; Others; 2006.

Soler et al.; Fully automatic anatomical, pathological and functional segmentation from CT scans for hepatic surgery, Soler et al.; In Hanson, K.M., ed.: Proc. SPIE Medical Imaging 2000: Image Processing. vol. 3979 of Presented at the Society of Photo-Optical Instrumentation Engineers (SPIE) Conference. (2000) 246-255; Others 2000.

Grady, Leo: "Random Walks for Image Segmentation", IEEE Transactions on Pattern Analysis and Machine Intelligence, Band 28, Nr. 11, Nov. 2006, pp. 1768-1783; Others.

(Continued)

*Primary Examiner* — Jingge Wu
(74) *Attorney, Agent, or Firm* — Harness, Dickey & Pierce, P.L.C.

(57) ABSTRACT

A method is disclosed for segmenting image data for detecting a liver of a subject under examination. In at least one embodiment, the method includes determining as rib pixels which represent a rib, determining pixels which delimit an area inside the rib cage, determining pixels which represent a pixel of the liver and determining a probability, for each pixel inside the rib cage, as to whether the pixel belongs to the liver or not, with the aid of a Random Walker method.

31 Claims, 7 Drawing Sheets

OTHER PUBLICATIONS

Lamecker et al. A Statistical Shape Model for the Liver Medical Image Computing and Computer-Assisted Intervention—MICCAI (2) 2002: pp. 421-427; Others; 2002.

Seong-Jae Lim, Yong-Yeon Jeong and Yo-Sung Ho, Segmentation of the Liver Using the Deformable Contour Method on CT Images, Buchreihen Lecture Notes in Computer Science, Verlag Springer Berlin / Heidelberg, vol. 3767/2005, Advances in Mulitmedia Information Processing—PCM 2005; Others; 2005.

German Patent Office Action dated Apr. 22, 2008.

* cited by examiner

METHOD FOR SEGMENTING IMAGE DATA FOR DETECTING A LIVER

PRIORITY STATEMENT

The present application hereby claims priority under 35 U.S.C. §119 on German patent application number DE 10 2007 028 270.4 filed Jun. 15, 2007, the entire contents of which is hereby incorporated herein by reference.

FIELD

Embodiments of the present invention generally relate to a method and/or a device for segmenting image data for detecting a liver and particularly for segmenting image data with the aid of a Random Walker method, wherein in at least one embodiment, the method and/or the device determine pixels of the image data as liver seed points and background seed points as an intermediate step.

BACKGROUND

Segmenting image data such as, for example, image data from a computer tomography scanner in order to detect a liver in a subject under examination such as, for example, a person, represents a fundamental preprocessing step for a number of applications. Thus, segmenting image data for detecting the liver is helpful, for example, in planning a surgical intervention or in an image-directed liver treatment.

However, automatic and accurate segmentation of image data for liver detection provides a number of problems. The size and shape of the liver can be very different in dependence on the patient and the type of illness. In particular, a cirrhosis of the liver or a tumor inside the liver influence the size and shape of the liver in a scarcely predictable manner. In addition, the signal values which are detected, for example, by a computer tomography scanner can vary over a wide range inside the liver and the surrounding area in dependence on basic scanner parameters and a quantity of a contrast agent administered. Segmentation of the image data is very difficult particularly at the transition between liver tissue and muscle tissue between the ribs because of the similar X-ray absorption of the liver tissue and the musculature. In addition, tumors or a fatty liver illness lead to greatly different signal values of computer tomography image data inside the liver.

A general method for segmenting image data is disclosed in US 2006/0147126 A1 which carries out image data segmenting with the aid of the so-called Random Walker method on the basis of a theory of graphs. The Random Walker method operates in such a manner that a user initially provides some pixels with markings. At least one pixel which is located inside the liver is marked as a liver pixel (liver seed point) and at least one further pixel which does not belong to the liver is marked as background seed point. Segmenting of the image data is then determined by the Random Walker method as follows: for each pixel, the probability is calculated that a Random Walker which starts at this pixel reaches a pixel with a marking.

The direction in which the Random Walker moves is random but the probability for a direction of movement can be influenced by weights between two adjacent pixels. The more similar two pixels are (for example the more similar the signal values of two adjacent pixels are) the greater is the probability that the Random Walker selects this transition. The marking having the greatest probability is then allocated to the pixel.

Instead of a real Random Walker simulation, the probabilities can be calculated analytically as indicated in US Patent No. 2006/0147126 A1.

Problems of the aforementioned Random Walker method are, on the one hand, to automatically determine a suitable selection of pixels which are allocated with the greatest probability, for example to the liver or to the background, respectively, and to provide a suitable weight function. In addition, an analytic calculation of the Random Walker method requires considerable computing expenditure in the case of large image data volumes which can lead to undesirably long waiting times during the segmenting.

SUMMARY

In at least one embodiment of the present invention, to a method and/or a device are provided for segmenting the image data for detecting a liver of a subject under examination, which reliably and automatically determine pixels which either belong to the liver or belong to the background and which segment the image data with the aid of a Random Walker method and of the pixels which either belong to the liver (liver seed points) or which belong to the background (background seed points).

At least one embodiment of the present invention provides a method for segmenting image data for detecting a liver of a subject under examination, wherein the image data include a number of pixels to which in each case one signal value is allocated. The method comprises the following steps:

Determining pixels which represent a rib, wherein these pixels are designated as rib pixels;

Determining pixels which delimit an area inside a rib cage. These pixels are determined with, the aid of the rib pixels; and Determining at least one pixel which represents a pixel of the liver. This at least one pixel is designated as liver pixel. The at least one liver pixel is determined from the set of pixels which are located in the area inside the rib cage.

The rib pixels and the pixels which delimit the area inside the rib cage are defined as background seed points. The at least one liver pixel is defined as liver seed point.

For each pixel inside the rib cage, a probability is determined whether the pixel belongs to the liver or not. Determining the probability is done with the aid of the Random Walker method which uses the liver seed points and the background seed points for determining the probability.

Determining first pixels which represent a rib and, on the basis of this, determining pixels which delimit an area inside the rib cage makes it possible to delimit to a great extent the set of pixels which can be considered at all as liver pixels. This increases the probability that liver seed points are found reliably. In addition, defining the rib pixels and the pixels which delimit the area inside the rib cage as background seed points ensures that the Random Walker method reliably detects all pixels outside the rib cage as pixels which do not belong to the liver. This achieves an improved segmenting of the image data and more reliable detection of the liver.

According to one embodiment of the present invention, the image data can include a number of image data layers. The number of image data layers are arranged in anatomical order of the subject under examination. The determining of pixels which represent a rib is carried out separately for each individual layer of the image data. By determining the pixels which represent a rib separately for the various layers of the image data, the computing expenditure needed can be reduced and thus a faster segmenting can be effected. If no rib pixel can be found, rib pixels can be interpolated by way of the information from the neighboring layers. The later segmenting can use the three-dimensional image data information.

According to a further embodiment of the present invention, the determining of pixels which represent a rib also includes the following steps:

Firstly, pixels are determined which are located inside the subject under examination and pixels are determined which are located outside the subject under examination in order to determine a first boundary. This first boundary represents a skin surface of the subject under examination. Starting from this first boundary, pixels are determined which are located inside a fatty tissue and a skin of the subject under examination and pixels are determined which are located inside a muscle tissue under the fatty tissue of the subject under examination. By way of the transition from fatty tissue to muscle tissue, a second boundary is determined. Starting from the second boundary, pixels are determined in a predetermined area which extends from the second boundary towards the center of the body which represent pixels of a rib. The predetermined area which extends from the second boundary towards the center of the body can be selected in dependence on the location of the pixels. When a system of polar coordinates is used for addressing pixels as will be described in the text which follows, a location dependence of a pixel can be determined in a simple manner with the aid of an angle of the system of polar coordinates.

By determining first the outer surface of the subject under examination, i.e. the skin, and, on the basis of this, determining the second boundary between the fatty tissue and the muscle tissue, the position of pixels which represent a rib can be predetermined by introducing prior anatomic knowledge since the ribs are typically located in an outer area of the muscle tissue closely below the fatty tissue. By additionally restricting the predetermined area in dependence on the location, i.e. on whether pixels in a lateral (right-hand or left-hand) or front or rear area of the body are examined, rib pixels can be determined more reliably and with less computing expenditure.

To determine pixels which delimit the area inside the rib cage, the method can include a joining of the rib pixels by means of a continuous line in accordance with one embodiment. Pixels which are located on the continuous line are defined as background seed points.

Furthermore, the pixels which delimit the area inside the rib cage can be determined by determining individual ribs by combining coherent pixels which belong precisely to one rib. For each individual rib, a center is then determined and a pixel which corresponds to the center of the rib is defined as rib center of an individual rib. By joining the rib centers with the aid of a spline interpolation, pixels are determined which delimit the area inside the rib cage and the pixels which are located on the spline interpolation are defined as background seed points.

By forming a continuous line or a spline interpolation which delimits the area inside the rib cage, and defining the pixels which are located on the continuous line or which are located on the spline interpolation, respectively, as background seed points, the area in which the subsequent Random Walker method is carried out is reliably delimited to the internal space of the rib cage. As a result, the segmenting becomes more reliable and can be calculated more rapidly due to the delimited space.

In one embodiment of the present invention, liver seed points and background seed points inside the rib cage can be determined as follows. Firstly, a signal value histogram of the signal values of the pixels which are located inside the rib cage is determined. Then pixels inside an area of the rib cage with a signal value within a predetermined first variance of a first maximum of the signal value histogram are defined as background seed points and pixels inside an area of the rib cage with a signal value within a predetermined second variance of a second maximum of the signal value histogram are defined as liver seed points.

Since inside the rib cage pixels are essentially located which either belong to the stomach or to the liver of the subject under examination, mean value and variance of this Gaussian distribution can be determined by a bimodal distribution analysis. Thus, liver seed points and background seed points (pixels which can be allocated to the stomach) can be reliably determined in a simple manner inside the rib cage so that the image data can be reliably segmented with the subsequent Random Walker method. By defining a large number of additional seed points, less computing expenditure is needed for the subsequent Random Walker method and the segmenting can thus be carried out more rapidly. By restricting the area inside the rib cage, e.g. to an area in the right-hand and front part of the rib cage in which liver seed points are sought, the reliability of the method can be increased and the computing time reduced.

In a further embodiment of the method according to the invention, the determining of a probability for each pixel whether the pixel belongs to the liver or not is carried out with the aid of the Random Walker method in a first coarse determination on the basis of image data of a first resolution which has a coarser resolution than the original resolution and in a second fine determination which is based on the results of the first coarse determination and image data in the original resolution. The coarser resolution can be determined, e.g., by combining in each case 3×3 pixels of the original resolution to form a pixel of the coarser resolution. In this context, pixels for which a predetermined minimum probability for belonging to the liver was determined in the first determination can be used as additional liver seed points for the second fine determination. In addition, for the second fine determination, pixels for which a predetermined minimum probability for belonging to the background was determined in the first determination can be used as additional background seed points.

In this context, the additional seed points can be defined either as seed points with an unambiguous, i.e. 100-percent association with either the background or the liver or as seed points to which a percentage probability of association either with the liver or the background is allocated. The Random Walker method can be changed so that it is suitable for processing seed points which have such a percentage probability of association.

By using the Random Walker method in two steps, a first coarse determination and a second fine determination, the computing expenditure needed for carrying out the Random Walker method can be considerably reduced. Since the first coarse determination is based on image data of a first resolution which has a coarser resolution than the original resolution, the first coarse determination comprises considerably fewer image data and can thus be determined considerably more rapidly. By the results of the first coarse determination being used as additional background seed points or liver seed points for the second fine determination, the second fine determination is based on considerably more seed points, as a result of which the computing expenditure for the second fine determination is again greatly reduced. The result is thus that the segmenting results can be provided rapidly.

According to one embodiment of the method of the present invention, the image data can comprise a number of image data layers which are arranged in anatomical order of the subject under examination. The pixels of an image data layer are addressed in a system of polar coordinates, wherein the origin of the system of polar coordinates is arranged approximately in a centroid of the layer of the subject under examination.

By using the system of polar coordinates having an origin approximately in a centroid of the layer of the subject under examination, the determinations previously described, of, for example, pixels on the first boundary or the second boundary or rib pixels can be carried out in a simple manner by examining the signal values along the radius of the system of polar coordinates. Furthermore, an anatomical position determination of pixels in a system of polar coordinates is possible in a simple manner via the angle of the system of polar coordinates in order to determine, for example, a front or a side area of the subject under examination.

In one embodiment of the present invention, a weight function or edge value function $w_{i,j}$ of the Random Walker method between two adjacent pixels i and j is determined in accordance with the equation $$w_{ij}=e^{-\beta \cdot (\Delta d)^2 \cdot c \cdot n \cdot f(g_i-g_j)},$$

where n is a scaling value which is selected in dependence on a selected function f and a signal value range of the pixels. For example, $f(g_i-g_j)=|g_i-g_j|$ can be selected as function f. In the case of signal values which are generated, for example, by a computer tomography scanner, n can then be selected, for example, within a range of from 300 to 400, for example 360. If, in the case of signal values of a computer tomography scanner, the function $f(g_i-g_j)=(g_i-g_j)^2$ is selected as function f, n can be selected, for example, within a range of from 50 to 120, for example 60.

The value $\Delta d$ represents a distance between the pixels i and j. Since in the case of image data which include a number of image data layers the distance between two pixels within one image data layer is generally different from the distance between two pixels between two image data layers, the value $\Delta d$ is used in dependence on the pixels i and j in the above equation.

The value c is a scaling value which is selected in dependence on a movement of the subject under examination between determinations of the pixels i and j which are temporally offset. The value $\beta$ is a normalization factor which is selected in dependence on a contrast range of the image data. The function f is used for determining the difference between the signal values $g_i$ and $g_j$ of the pixels i and j and is selected, for example, as specified above.

Since the weight function $w_{i,j}$ takes into consideration, in particular, the distance $\Delta d$ between adjacent pixels i and j, which can be greatly different in dependence on whether the pixels are within a layer or not, and, in addition, exhibits the scaling and correction values $\beta$, c and n, a weight function which is suitably adapted with respect to the image data to be processed is provided for the Random Walker method.

In a further embodiment of the present invention, computer tomography data are used as image data. The signal values then comprise Hounsfield values of the computer tomography data. Due to the scaling value n, no further recalculation of the Hounsfield values for use in the Random Walker method is necessary.

When computer tomography data with Hounsfield values as signal values are used, in particular, pixels which represent air or other gases, or pixels which represent bones, or pixels which represent fat, can be simply identified on the basis of their Hounsfield values and defined as background seed points. In addition, it is also possible to define as background seed points, for example, pixels which represent an aorta. These additional background seed points increase the reliability of segmenting with the aid of the Random Walker method and, at the same time, reduce the computing expenditure for carrying out the Random Walker method.

In a further embodiment of the method of the present invention, the image data for each pixel comprise a number of signal values, wherein the number of signal values are detected successively in time. Within the image data, pixel blocks which comprise a predetermined number of pixels, for example 32×32 pixels, are defined in the area inside the rib cage.

During the detection of the number of temporally successive signal values for each pixel, a perfusion of the subject under examination, for example with a contrast agent, is performed. Then a pixel block in which the number of pixels which exceed a predetermined threshold value rises during the temporally successive signal value detection is determined and defined as a starting pixel block. Pixels of this starting pixel block which exceed the predetermined threshold value can then be defined as liver seed points.

In this manner, additional liver seed points, for example, can be reliably determined due to the perfusion in the performance of a perfusion computer tomography and thus the segmenting of the image data can be improved.

In addition, a pixel block can be defined as starting pixel block if the number of pixels which exceed a predetermined threshold value rises during the temporally successive signal value detection, and if the number of pixels which exceed the predetermined threshold value includes a predetermined proportion of the total number of pixels of the pixel block. This predetermined proportion can include, for example, 40%.

By only defining a pixel block as starting pixel block if additionally at least a predetermined proportion of the total number of pixels of the pixel block rises above the predetermined threshold value during the temporally successive signal value detection, the method becomes more robust against disturbances and liver seed points can thus be determined more reliably.

In addition, a region growing method can be applied in which the previously determined starting pixel block is used as starting point for the region growing method. Starting from this starting pixel block, further pixel blocks are then sought in accordance with the region growing method, using a transgression of the predetermined threshold value of a predetermined proportion of the pixels of the pixel block as membership criterion as described before. Pixels of the pixel blocks which, according to the region growing method, belong to the starting pixel block are defined as liver seed points if they exceed the predetermined threshold value.

By applying the region growing method, the number of liver seed points can be increased on the basis of a reliably determined starting pixel block. Using the additional liver seed points, the subsequent Random Walker method can perform reliable segmenting of the image data, wherein a required computing time for the Random Walker method can be reduced due to the large number of liver seed points.

At least one embodiment of the present invention also provides a device for segmenting image data for detecting a liver of a subject under examination.

The image data include a number of pixels to which in each case one signal value is allocated. The device includes an element for determining pixels which represent a rib, these pixels being designated as rib pixels. Furthermore, the device includes an element which determines, with the aid of the rib pixels, pixels which delimit an area inside a rib cage. A further element of the device determines at least one pixel which is located within the set of pixels inside the area of the rib cage and which represents a pixel of the liver. Such a pixel is called liver pixel. Further elements of the device are used for defining as background seed points rib pixels and pixels which delimit the area inside the rib cage and defining as liver seed point the at least one liver pixel. Finally, the device includes an element which determines for each pixel inside the rib cage a probability which specifies whether the pixel belongs to the liver or not. In this arrangement, the element uses a Random Walker method, the liver seed points and the background seed points. Furthermore, the device can be designed for carrying out one or more of the methods previously described.

Such a device has the same advantages as the method described before, and its embodiments, and these advantages are therefore not repeated again here.

In addition, at least one embodiment of the present invention includes a computer program product, particularly a software product which can be loaded into a memory of a programmable processing unit of a device for segmenting image data. Using program means and this computer program product, all embodiments of the method according to the invention described above can be carried out if the computer program product is executed in the processing unit.

Finally, at least one embodiment of the present invention discloses an electronically readable data medium, for example a CD or DVD on which electronically readable control information, particularly software, is stored. When this control information is read from the data medium and stored in a processing unit of a device for segmenting image data, all embodiments of the method described above according to the invention can be carried out.

BRIEF DESCRIPTION OF THE DRAWINGS

In the text which follows, the present invention will be explained by way of example embodiments, referring to the drawings, in which.

DETAILED DESCRIPTION OF THE EXAMPLE EMBODIMENTS

Figure 1:
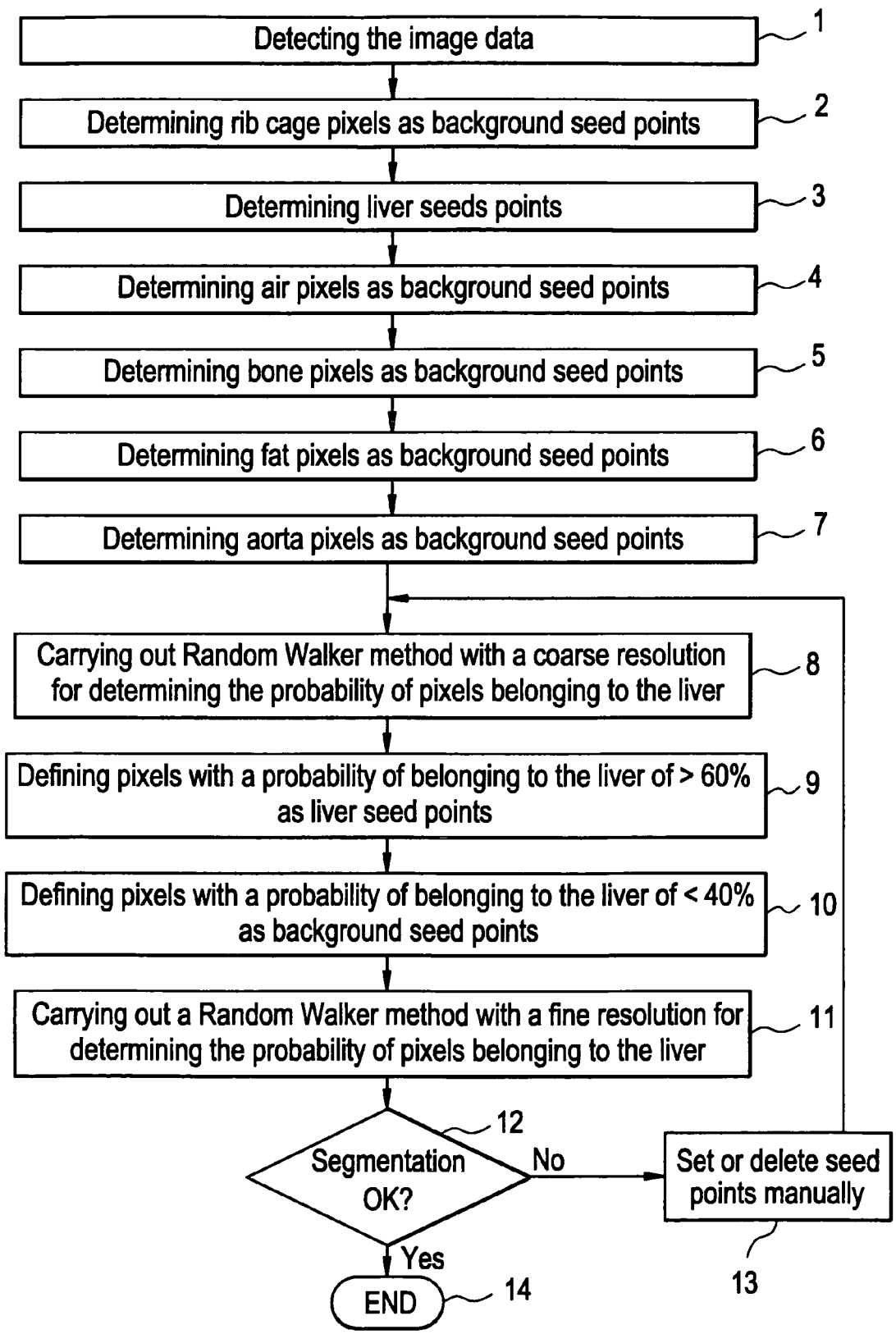
FIG. 1 is a flowchart which represents the method steps of the method according to an embodiment of the invention.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

FIG. 1 shows an overview of an embodiment of the method steps according to the invention for segmenting the image data for detecting a liver of a subject under examination.

In a step 1, the image data are detected. These image data can be preferably image data of a computer tomography scanner, wherein for each pixel of the image data a Hounsfield value is detected as a signal value. In addition, the image data can comprise a number of image data layers which are arranged in anatomic order of the subject under examination. The detected image data can also comprise image data which allocate to each pixel a number of signal values, the number of signal values being detected successively in time so that, for example, signal value changes are detected, for example as part of a performance of a perfusion computer tomography.

To avoid over-segmentation of the liver into the adjacent muscle tissue between the ribs, the shape of the rib cage is determined in a step 2 and the pixels which are components of the rib cage are defined as background seed points. The precise method for determining rib cage pixels will be described in the text which follows, with reference to FIGS. 2-6.

In a step 3 of the method, pixels are determined which represent pixels of the liver, and are defined as liver seed points. The precise method for determining liver seed points will be described in the text which follows, referring to FIGS. 7-10.

In method steps 4-7, further pixels are defined as background seed points which can be determined directly on the basis of their Hounsfield value. Thus, for example, pixels which represent air or other gases have a Hounsfield value of −460 or less. These are thus defined as background seed points. Similarly, for example, pixels which represent bones have Hounsfield values of 325 or more and can thus also be defined as background seed points. Finally, pixels which represent fatty tissue within the body can also be determined as background seed points on the basis of their Hounsfield value of between −117 and −53.

After a sufficient quantity of liver seed points and background seed points has been determined, a Random Walker method with a coarse resolution is carried out in method step 8 for determining the probability of membership of the remaining pixels of the image data to the liver. In method step 9, pixels having a probability of belonging to the liver of more than for example 60% are also defined as liver seed points. Similarly, pixels having a probability of belonging to the liver of less than 40% are defined as background seed points in method step 10. Naturally, the two probability limits can also be placed differently. Using these additional liver seed points and background seed points, a Random Walker method with a fine resolution is carried out for determining the probability of pixels belonging to the liver. After that, the automatic segmentation of the image data is concluded.

These additional seed points which have been determined by the Random Walker method having the coarse resolution can also include, apart from their information of belonging either to the liver or to the background, the calculated membership probability. A Random Walker method which is designed for using this additional membership probability can utilize this probability information for determining a more reliable segmentation.

In a method step 12, a user of the method can assess the quality of the segmentation and either end the method (step 14) or create a new configuration of seed points on the basis of the automatically determined seed points by manually adding or deleting liver seed points or background seed points (step 13). This new configuration can then be used for segmenting the image data by again carrying out the Random Walker method of steps 8-11.

Figure 2:
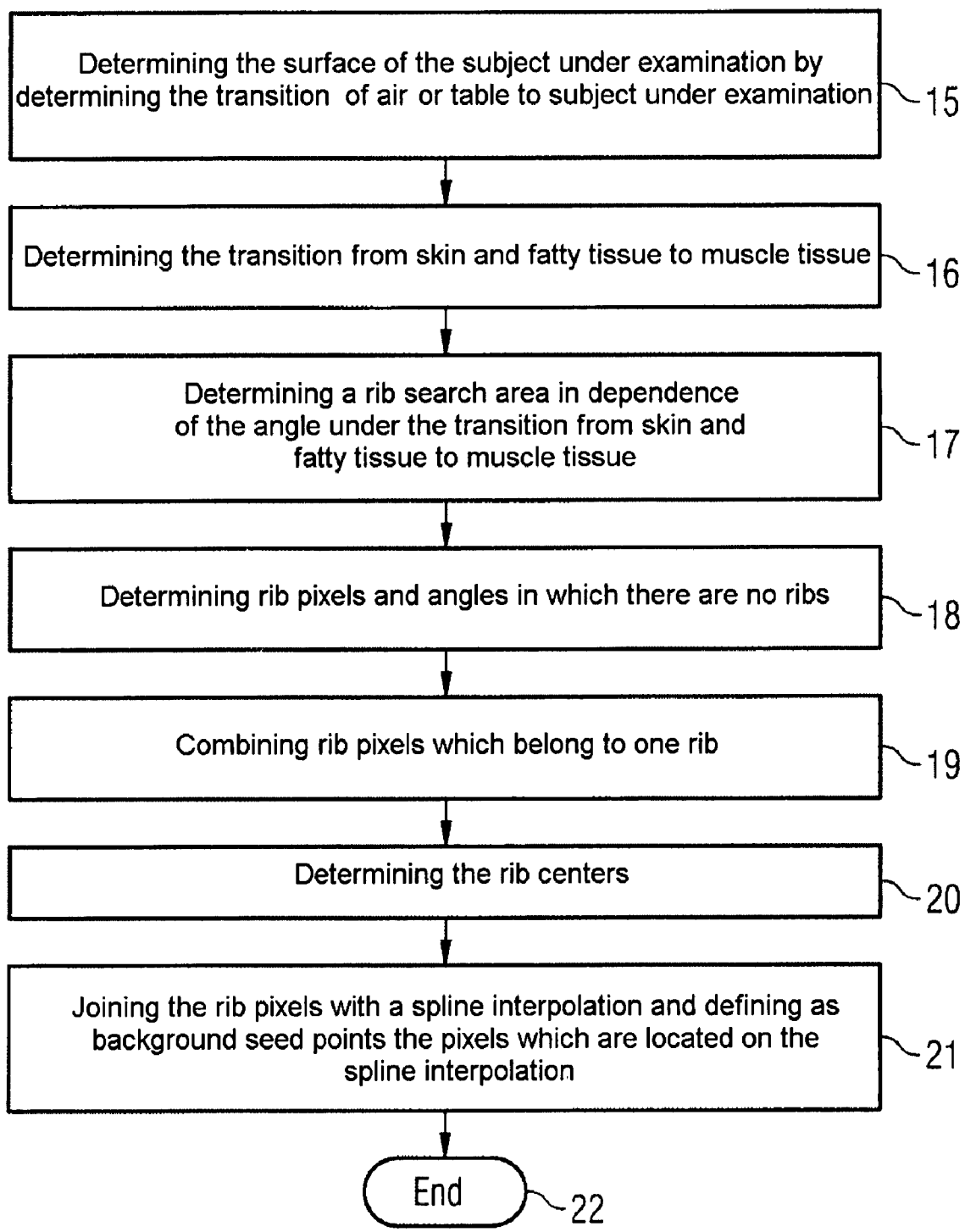
FIG. 2 is a flowchart which represents method steps according to an embodiment of the invention for determining background seed points which delimit an area within the rib cage.

FIG. 2 shows method steps for determining pixels which delimit an area within a rib cage.

Figure 3:
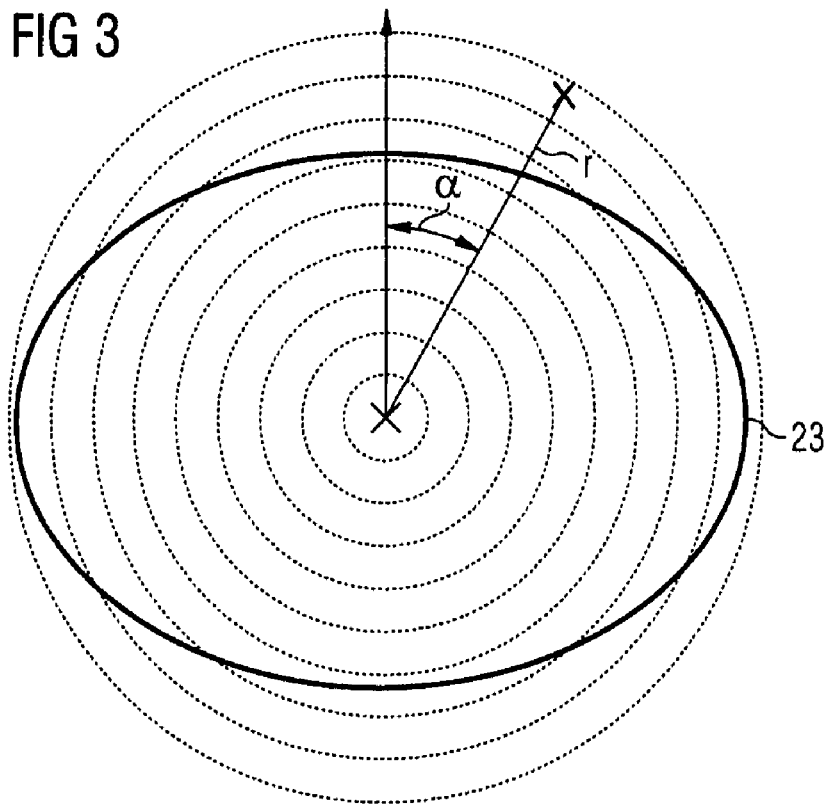
FIG. 3 is a diagrammatic representation of a subject under examination in a system of polar coordinates.

As shown in FIG. 3, a system of polar coordinates is used in conjunction with each layer of the image data. The center of the system of polar coordinates is approximately placed on the centroid of the body within a body surface 23 of the subject under examination. The centroid is calculated, for example, from all pixels having a signal value higher than a predetermined threshold value (for example −460 Hounsfield units). The advantage of using the system of polar coordinates is that distances between points within the body and the centroid can be calculated in a simple manner. The radius coordinate r of a point is its distance from the centroid of the body. In addition, the angle coordinate a can be simply related to the anatomy in order to implement anatomical restrictions in individual areas of the layer as shown, for example, in FIG. 4. Thus, for example, right-hand, left-hand, front or rear areas or sectors of the body can be determined via the angle coordinate a.

The method for determining pixels which delimit an area within the rib cage operates as follows:

Firstly, a surface 23 of the subject under examination is determined by determining the transition from air or from the table to the subject under examination in a step 15 of FIG. 2. For this purpose, the radius coordinates for pixels which are located on the body surface 23 are determined in the aforementioned system of polar coordinates. These radius coordinates r are determined separately for individual angle values a. This step is performed iteratively in each case for each angle a. Firstly, with a given angle a, a point having a maximum radius which is just located within the image is selected as a starting position. The radius r is iteratively reduced until the skin of the subject under examination is reached. For this purpose, the mean signal value is calculated in a small area around the current pixel in each iteration step. The iteration is ended when the calculated mean value is higher than a possible Hounsfield value for air. Finally, a mean-value filter is applied to all calculated radii in order to remove outliers.

Figure 4:
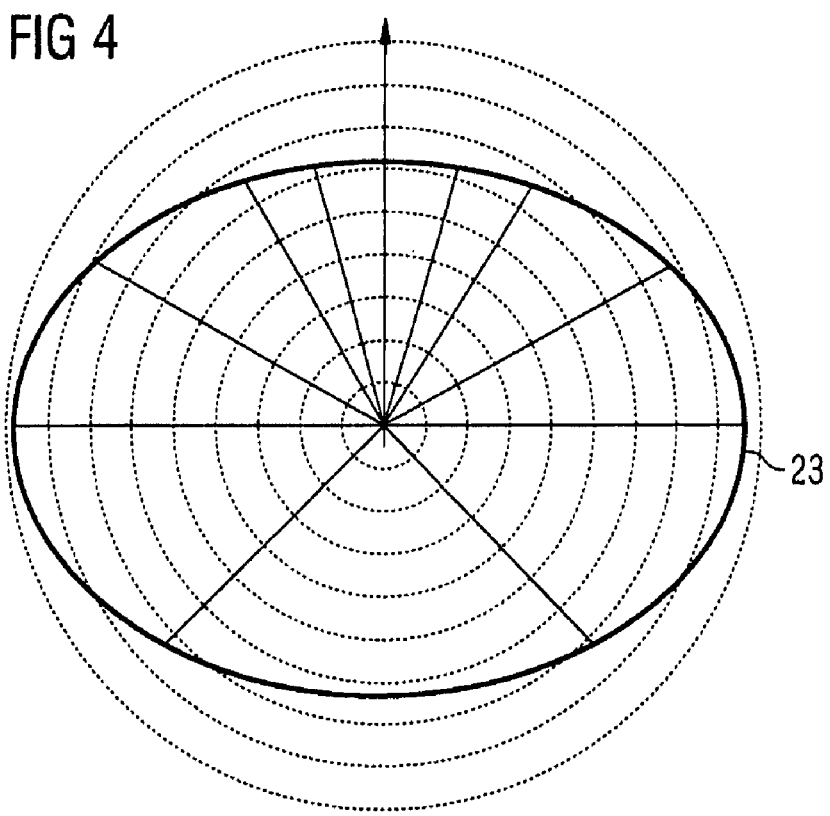
FIG. 4 is a diagrammatic representation of a subject under examination which is divided into various sectors.

Thus, pixels can be determined on the surface 23 of the subject under examination as shown in FIGS. 3 and 4.

Figure 5:
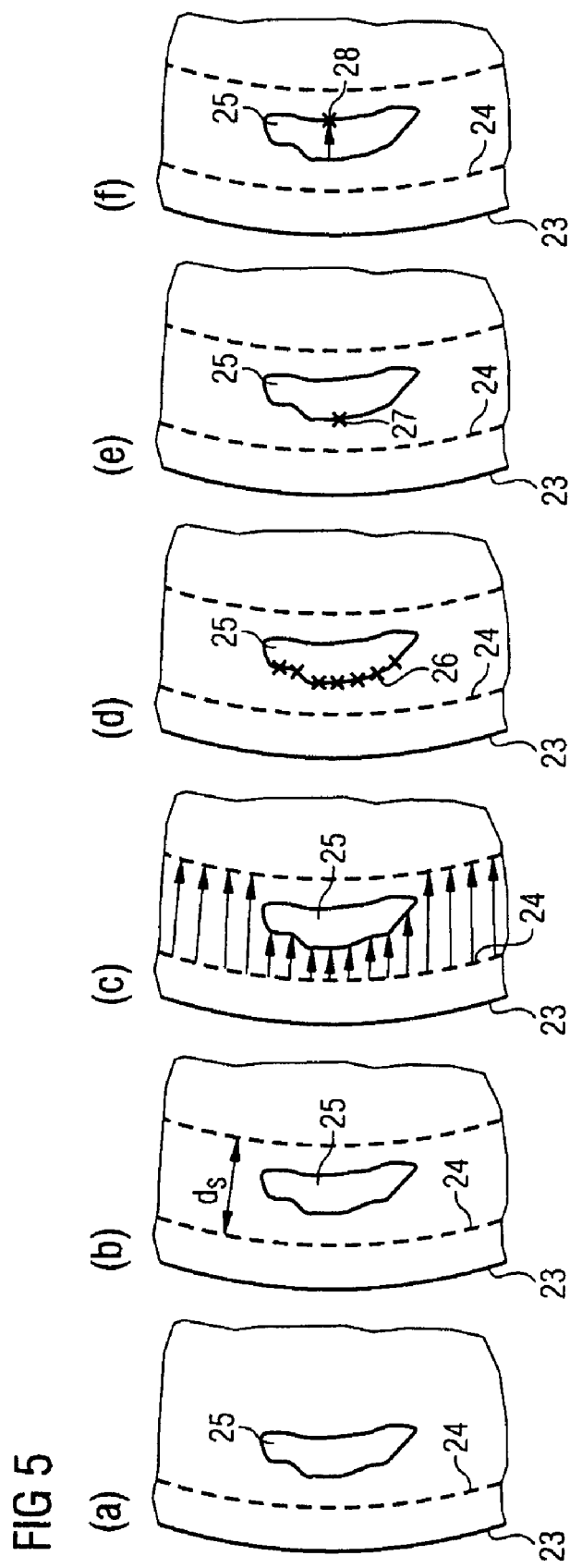
FIG. 5 is a diagrammatic representation of the method steps according to an embodiment of the invention for determining rib pixels.

In a next method step 16 (FIG. 2), a boundary between skin and fatty tissue to the muscle tissue is determined. The search begins at positions of the body's surface 23 which has been determined in method step 15 (FIG. 2). FIG. 5 shows the further proceedings. Firstly, the radii of the surface positions in polar coordinates are reduced by e.g. 5 mm in order to skip skin pixels. Then the radius is iteratively reduced as in the preceding method step. The iteration is ended when a mean signal value within a small circle around the current pixel is higher than 0 Hounsfield units. After all radii have been calculated for all angle values, a mean-value filter is again applied in the circumferential direction in order to eliminate outliers and to smooth the boundary 24 found between fatty tissue and muscle tissue. An angle-dependent core value can be used in the mean-value filter. In the front part of the body, the core can be selected to be three times larger since more outliers, which can be eliminated in a simple manner using such a filter, are located there in the area of the linea alba, a strip of sinews between the stomach muscles. FIG. 5a shows the boundary 24 thus found between the fatty tissue and the muscle tissue.

On the basis of the boundary 24, an angle-dependent maximum rib search depth $d_s$ is defined as is shown in FIG. 5b (step 17 of FIG. 2). In the front part of the abdomen there are no ribs, and the search depth is therefore set to 0 there (step 18 of FIG. 2). In the right- and left-hand side of the body, the search depth is set, for example, to 1.3 cm and in the rear part of the body, the search depth is set to, for example, 2 cm since most of the patients have more muscle mass in the vicinity of the spine. In the restricted search area $d_s$ defined in this manner, pixels having high signal values are determined as rib pixels with the aid of a dynamic threshold function, as shown in FIG. 5c. The threshold values are automatically adapted with the aid of a histogram analysis of narrow areas in order to prevent ribs 25 having low signal values from not being detected. All angles for which no ribs have been found within the search area are provided with a corresponding marking. The rib positions found are also correspondingly marked, as shown as rib pixels 26 in FIG. 5d.

The detected rib pixels 26 are combined by way of a hierarchical cluster analysis method in dependence on the radius r and the angle a of the pixel values which belong to the ribs 25. Starting with a large number of clusters, the clusters are combined until the distances between the cluster centers reach a predetermined value (step 19 of FIG. 2). The final cluster centers are determined as the outer rib positions 27 per rib 25, as shown in FIG. 5e. Starting from the outer rib positions 27, corresponding inner rib positions 28 are determined by examining the course of the signal values in the direction of the body centroid, as shown in FIG. 5f. In method step 20 (FIG. 2), the rib centers 29 of FIG. 6 are determined by slightly displacing the inner rib positions 28 in the direction of the outside of the body.

Figure 6:
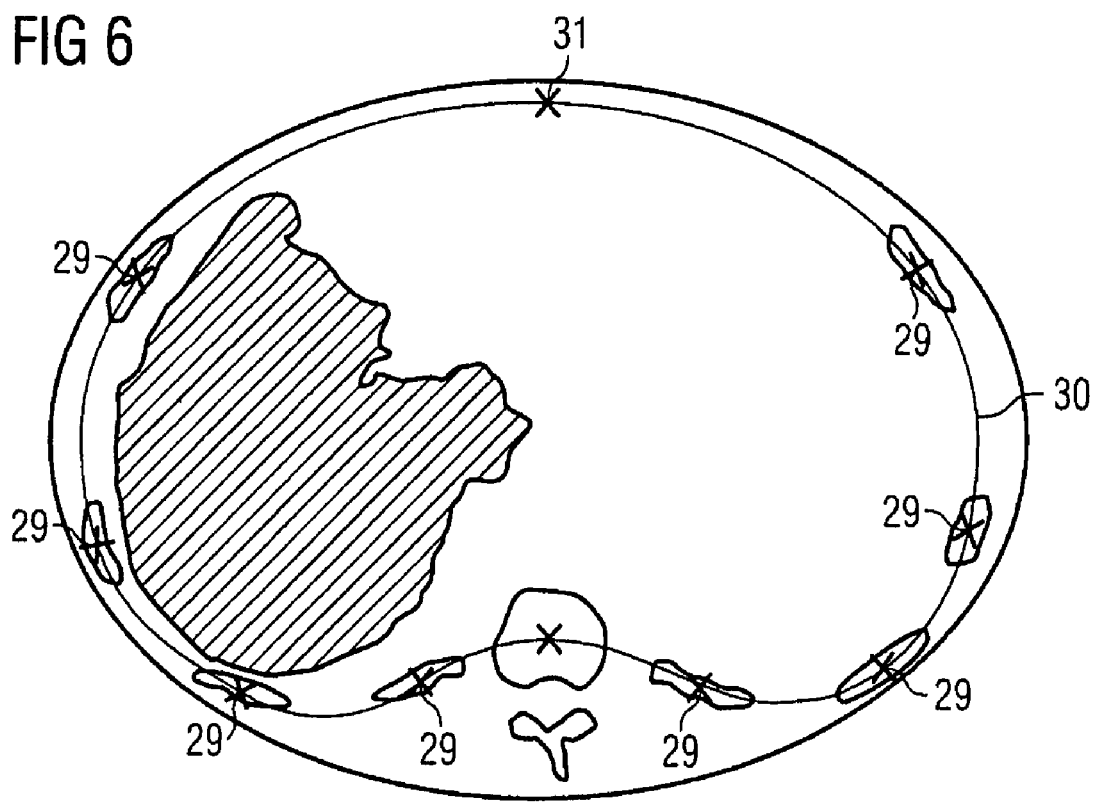
FIG. 6 is a diagrammatic representation of a subject under examination in which an area within a rib cage is delimited with the aid of rib pixels and a spline interpolation.

The rib centers 29 (FIG. 6) are then used as nodes for a cubic spline interpolation 30 (FIG. 6). If there are not sufficient nodes for the spline interpolation 30 in a sector or area of the subject under examination, a check is made whether rib centers that can be used have been found in adjacent layer images of the image data. If adjacent layer images provide such rib centers, these rib centers are used by interpolating the corresponding rib centers. If no rib centers have been found in this area either in the adjacent image layers as, for example, in the top area of FIG. 6 where there are no ribs, points of the boundary 24 between fatty tissue and muscle tissue are used as substitute as, for example, in pixel 31 in FIG. 6. This prevents the spline interpolation from extending through the liver.

Pixels which are located on the spline interpolation are now defined as background seed points. This information prevents the liver from being segmented in the surrounding area of muscle and fatty tissue (method step 21 of FIG. 2).

In the representations of FIGS. 6-11, the right-hand side and the left-hand side are exchanged in comparison with the usual anatomical representations so that the liver is shown on the left-hand side in the figures. In the description, on the other hand, right and left are used in the anatomical sense so that, for example in FIG. 7, the liver is described as being arranged in the right-hand half of the image data of the subject under examination even though it is shown as the shaded area on the left-hand side in FIG. 7.

In the text which follows, it will be explained with reference to FIGS. 7-10 how pixels are determined which belong to the liver and can thus be used as liver seed points.

To prevent faulty liver seed points from being determined, the search is restricted to image layers which have a large proportion of liver tissue. These layers are determined by counting the number of air pixels in the right-hand front area which is enclosed by the rib cage spline interpolation. For this purpose, prior anatomical knowledge is used that there is air within the lung above the liver and some air within the intestine below the liver.

Figure 7:
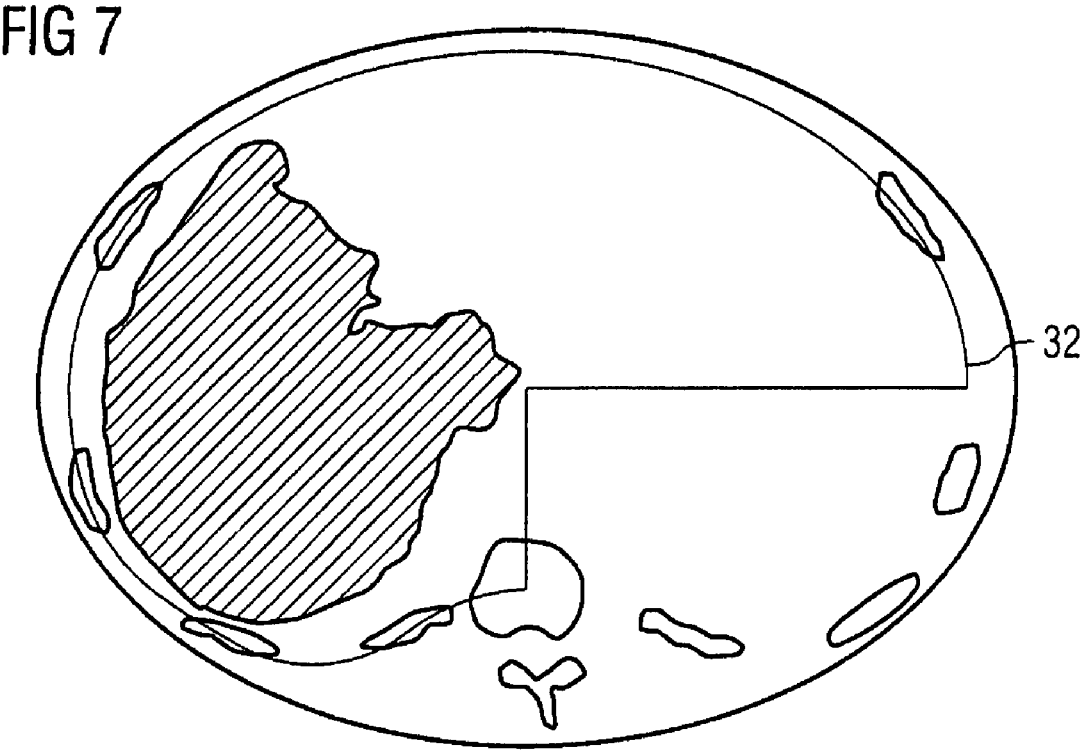
FIG. 7 is a diagrammatic representation of the subject under examination wherein an area in which a liver of the subject under examination is located is delimited within a rib cage.

As represented in FIG. 7 by line 32, a signal value histogram is generated from pixels in the front (top in FIG. 7) and right-hand rear (left-hand bottom in FIG. 7) part of the abdomen which is enclosed by the cubic spline interpolation. It is assumed that the Hounsfield values of the liver and of the stomach are subject to Gaussian distributions. Thus, mean value and variance of these Gaussian distributions are determined by a bimodal distribution analysis. To prevent a bimodal analysis being used when no stomach is visible, the peaks in the histogram are counted. If there is only a single peak, only the Gaussian distribution of the liver is determined. Mean value and variance of the Gaussian distribution of the liver are used for defining the range of signal values of the liver pixels.

Figure 8:
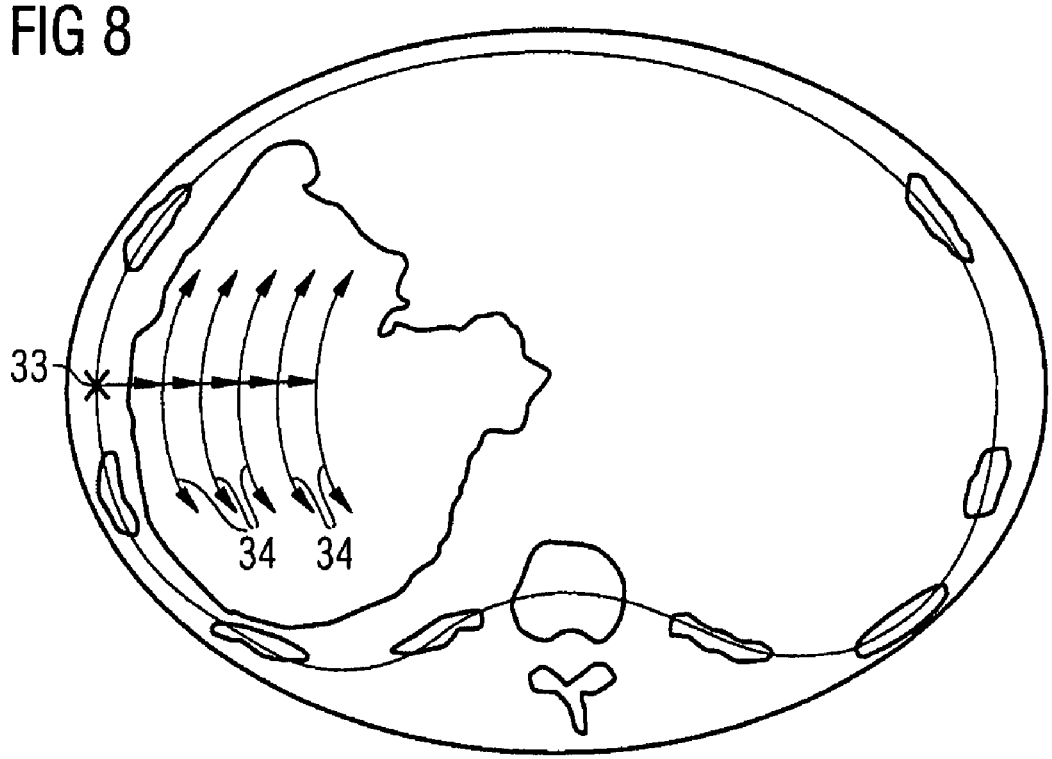
FIG. 8 is a diagrammatic representation of a subject under examination in which liver seed points are determined according to an embodiment of the method according to the invention.
Figure 9:
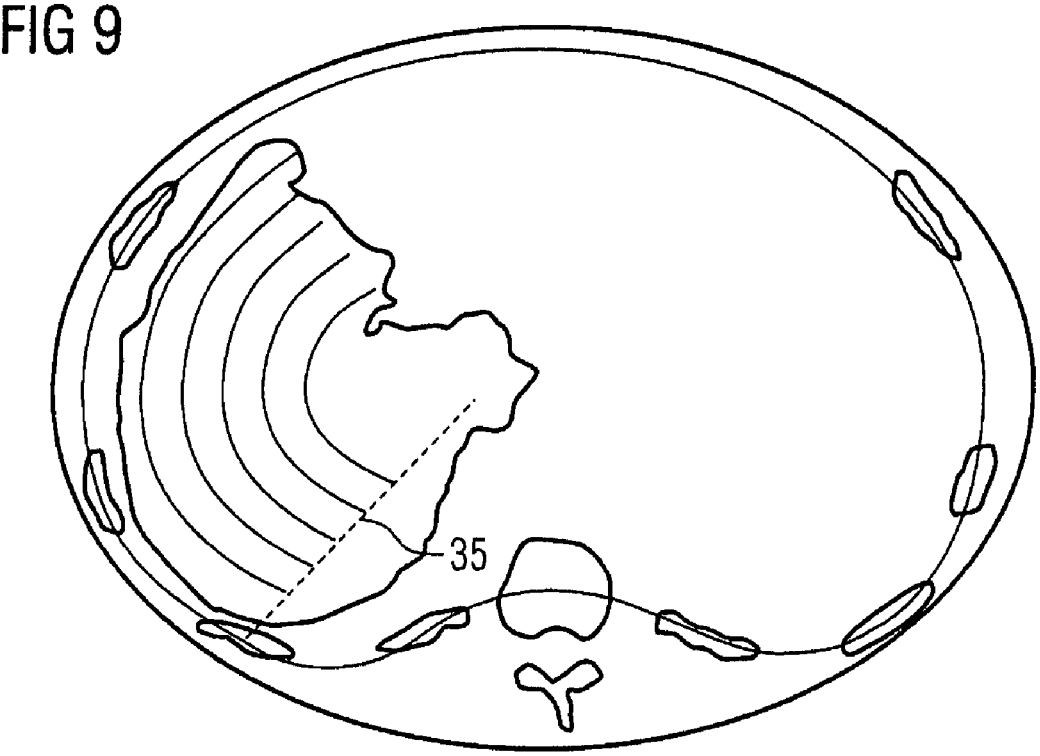
FIG. 9 is a further diagrammatic representation which represents the result of a determination of liver seed points according to an embodiment of the method of the present invention.

Starting from a pixel of the spline interpolation which is as far on the right in the body as possible, such as for example point 33 in FIG. 8, the search for liver pixels which can be used as lever seed points is begun. The radius is incrementally reduced and the pixels are checked to see whether they are located within an area which has been calculated from the histogram data (mean value and variance). If they meet this condition, they are defined as liver seed points. The angle of polar coordinates is then iteratively changed clockwise and counterclockwise. Thus, further liver seed points are defined with constant radius and altered angle as represented by lines 34 in FIG. 8. The search for liver seed points with constant radius and altered angle ends if either a pixel is not located within the area calculated from the histogram data or the angle has reached the rib center of the last visible rib as shown by line 35 in FIG. 9. If no further liver seed points are found by changing the angle, the search is continued in proximal direction by reducing the radius until no further liver seed points have been found within the area bounded by line 32 in FIG. 7.

During the application of a perfusion computer tomography examination, further liver seed points can be defined by determining the change in signal values with time whilst a contrast agent flows through the tissue.

Figure 10:
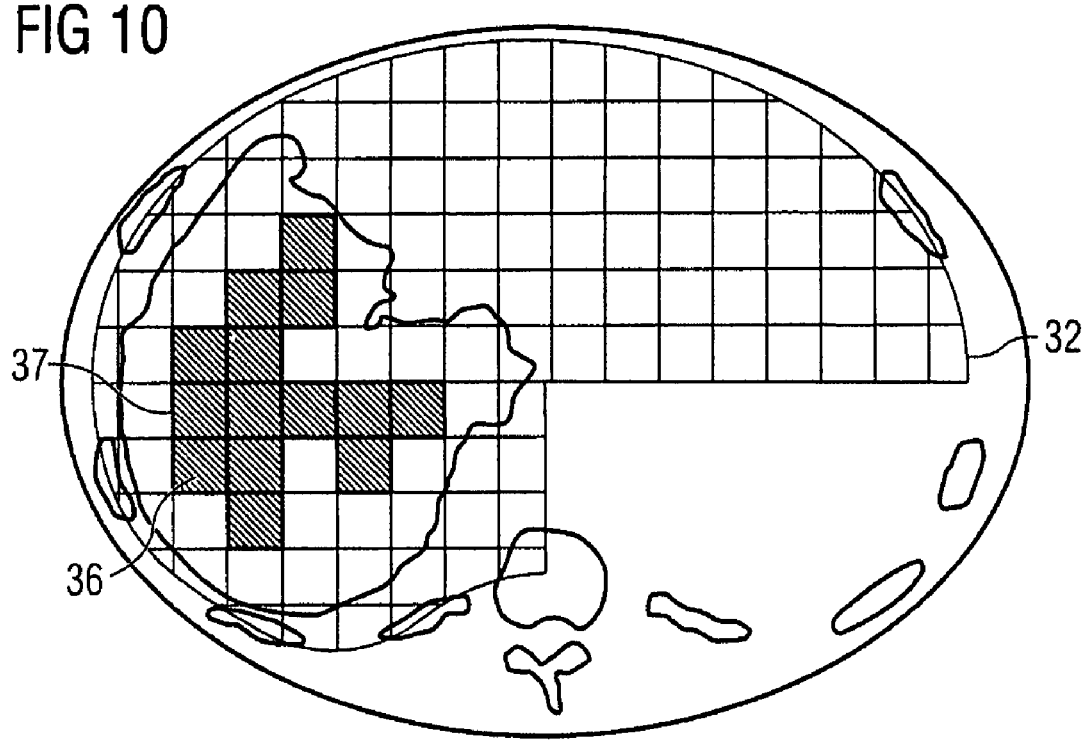
FIG. 10 is a diagrammatic representation of a subject under examination in which, according to a further method according to an embodiment of the invention, liver seed points are determined during a perfusion.

A collection of the contrast agent within the organ through which it flows leads to an increase in the average signal values of the pixels with time. This also applies especially to the liver. In addition, however, some pixels can change their intensity in the course of time due to a movement of the patient (for example due to breathing). For this reason, blocks of pixels of a size of 32×32 pixels within an area which is enclosed by the rib cage spline interpolation are checked for Hounsfield value changes, as shown in FIG. 10. The checked area is again restricted to the front and rear right-hand area of the subject under examination, as shown by line 32 in FIG. 10. The squares in FIG. 10 represent the blocks of pixels of 32×32 pixels.

During the perfusion computer tomography examination, the blocks of pixels are examined to see whether the number of pixels which are above a predetermined threshold value is rising. The predetermined threshold value can be, for example, in the range from −100 to −150 Hounsfield units. If the number of pixels which are above the predetermined threshold value comprises, for example, more than 40% of all the pixels of the block of pixels, the pixels which are above the predetermined threshold value are marked as possible organ pixels.

Starting from a starting pixel block which is a pixel block which is as close to the right-hand side of the rib cage as possible inside line 32 and which meets the conditions described above (at least 40% of all the pixels of the block exceed the predetermined threshold value), a region growing method is started. In FIG. 10, this starting pixel block can be, for example, the pixel block designated by reference symbol 37. The pixel blocks 36 which belong to the region of the starting pixel block 37 according to the region growing method are shown shaded in FIG. 10. The pixels of these pixel blocks 36, 37 are then defined as further liver seed points when they exceed the predetermined threshold value.

Figure 11:
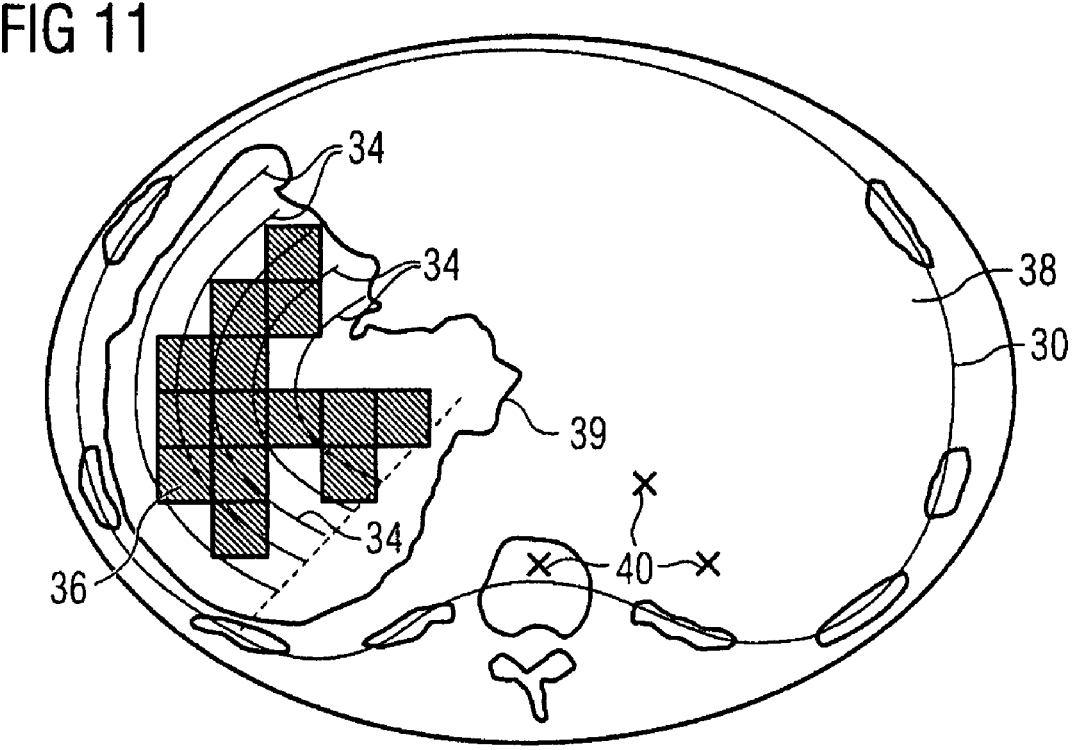
FIG. 11 is a diagrammatic representation of a subject under examination which represents the liver seed points which were determined according to the method according to an embodiment of the invention, and represents a segmentation of the image data for detecting the liver according to an embodiment of the invention.

It is particularly when computer tomography data with Hounsfield values as signal values are used that pixels which represent air or other gases or pixels which represent bones or pixels which represent fat can be simply identified on the basis of their Hounsfield values and are defined as background seed points such as, for example, the pixels 40 of FIG. 11.

Using the liver seed points and background seed points defined in this manner, a Random Walker method is used which determines for each pixel a probability with which this pixel belongs either to the liver or to the background.

In the segmentation of image data, the Random Walker method operates as follows. Firstly, a weight $w_{i,j}$ is determined for each edge between two adjacent pixels i and j with the aid of a weight function. The more similar the signal values of the two pixels i and j are, the greater is the weight $w_{i,j}$. Some pixels of the image data have a marking which indicates that this pixel is allocated with high reliability to a certain content of the image data such as, for example, the liver or the background. These marked pixels are also called seed points and are determined by means of the method explained before in the present embodiment. For all pixels to which no seed point marking is allocated, a probability is now determined with which they belong to one of the contents defined by the seed points.

This probability for a pixel is determined by the following conceptual model: starting from the pixel, a Random Walker wanders around with random movements until it encounters one of the seed points. The probability for a direction of movement of the Random Walker is not isotropic, however, but is influenced by the edge weights $w_{i,j}$. The higher the edge weight $w_{i,j}$, the higher the probability that the Random Walker wanders from pixel i to pixel j in its random walking. With the assistance of a statistically adequate number of attempts, the probability with which the Random Walker first encounters a particular seed point, for example a liver seed point or a background seed point, is determined for a particular pixel. This probability is determined for each pixel of the image data.

Instead of actually carrying out such statistical simulations, the probability can be calculated analytically for each pixel as described, for example, in US patent No. 2006/0147126 A1. The Random Walker method thus provides for each pixel of the image data a probability of belonging to the liver or the background, respectively.

Apart from their information of belonging either to the liver or the background, the seed points can also comprise the probability of belonging either to the liver or to the background. A Random Walker method which is designed for using this additional membership probability can use this probability information for determining a more reliable segmentation.

FIG. 11 shows the result of a segmentation with the aid of the Random Walker method, wherein the probabilities of the pixels of the image data belonging either to the liver or to the background were determined as follows:

To accelerate the calculations, the Random Walker method is carried out in two stages, the Random Walker method being applied to image data with a reduced coarser resolution in a first stage. In this case, the Random Walker method is initialized with interpolated probabilities of the seed points of the coarser resolution. This is more accurate in the case of a large number of seed points, as had been determined as described before. The Random Walker method is now carried out with coarser resolution on the image data. The coarser resolution can be produced, for example, by combining and interpolating in each case 3×3 pixels of the original resolution to form a pixel of the coarser resolution. In this case, the seed points additionally include probability information of belonging to the liver or to the background, respectively. As a result, the Random Walker method can be calculated much more rapidly.

The results for the pixels with the coarser resolution are then used for calculating the Random Walker method in the original resolution. If a liver membership probability of 60% or more was determined for a pixel of the coarser resolution, the corresponding pixels of the original resolution are defined as further liver seed points. As an alternative, only one of the original pixels, for example the center one of the original pixels, is defined as new liver seed point. For pixels of the coarser resolution for which a liver membership probability of less than 40% was determined, the corresponding pixels of the original resolution are defined as background seed points. As an alternative, only the center pixel of the original resolution can again be defined as background seed point here, too. Furthermore, the limit values of 60% and 40%, respectively, proposed previously, can be changed in accordance with the special requirements of a special application. In addition, the seed points can have probability information of belonging to the liver or to the background, respectively, which is used for an improved segmentation by a suitably altered Random Walker method.

The Random Walker method is now carried out with the additional liver seed points and background seed points in the original resolution of the image data. Due to the greatly increased number of seed points, this calculation of the Random Walker method can be distinctly accelerated.

The following equation is preferably used as weight function for determining the edge weights $w_{i,j}$:

$$w_{ij}=e^{-\beta \cdot (\Delta d)^2 \cdot c \cdot n \cdot f(g_i - g_j)},$$

where n is a scaling value which is selected in dependence on a selected function $f(g_i-g_j)$ and a signal value range, for example a Hounsfield value range, of the pixels. $\Delta d$ is a distance between the pixels i and j which, particularly in the case of image data which comprise a number of layer images, can be different in dependence on the pixels i and j. Thus, the distance $\Delta d$ between two pixels i and j within a layer image is, for example, in the range from 0.2 mm to 2 mm, whereas the distance $\Delta d$ between two pixels i and j of two different image layers can be, for example, in the range from 1 mm to 3 mm or even greater. The value c is a scaling value which is selected in dependence on a movement of the subject under examination between temporally offset determinations of the pixels i and j.

It is particularly when the pixels i and j are arranged in different image layers that a movement of the subject under examination can lead to errors in the case of recordings of the image layers offset in time. The greater the probability of a movement of the subject under examination between temporally offset determinations of the pixels i and j, the greater the selected scaling value c in order to correspondingly reduce the edge weight $w_{i,j}$. The value $\beta$ is a normalization factor which is selected in dependence on a contrast range of the image data. The function $f(g_i-g_j)$ is a function for determining the difference between the signal values $g_i$ and $g_j$ of the pixels i and j, respectively. The function f can be, for example, the simple absolute-value function $f(g_i-g_j)=|g_i-g_j|$ which leads to a better extension of the liver seed points.

As an alternative, a function $f(g_i-g_j)=(g_i-g_j)^2$ can be used which responds more sensitively to signal value gradients and supplies a better segmentation if there is a large number of liver seed points. The scaling value n can be selected, for example, in the range from 300 to 400, preferably 360, if the absolute-value function is used as the function f. If the squared difference function is used as the function f, the scaling value n can be used, for example, in a range from 50 to 120, preferably 60.

FIG. 11 shows image data of a layer of a subject under examination which were segmented with the aid of the Random Walker method described before. The liver seed points used for the Random Walker method were the liver seed points on lines 34 and in pixel blocks 36 which were determined as described before. The background seed points used were pixels on the spline interpolation 30 which were defined as described before, and background seed points 40 within the rib cage which were determined on the basis of their Hounsfield values as described before. The Random Walker method operates on the three-dimensional data of the several image data layers.

The Random Walker method was then applied to all pixels 38 which are located within the spline interpolation 30 and were not defined as liver seed points or background seed points. By way of the Random Walker method, a probability of belonging to the liver or to the background, respectively, is allocated in each case to these pixels. By specifying a predetermined threshold value, for example 50%, all pixels which have a liver membership of 50% or more are defined as liver pixels and all pixels which have a probability of belonging to the liver of less than 50% are defined as background pixels.

FIG. 11 shows the result of the segmentation. All pixels which are located inside the continuous line 39 were defined as liver pixels by the Random Walker method. All pixels located outside the continuous line 39 were defined as background pixels by the Random Walker method. This concludes the segmentation of the image data layer.

After this automatic segmentation, a user is able to assess the results. Using simple tools such as, for example, an electronic brush and an electronic eraser, the user can set or delete additional seed points. In this context, both seed points which represent background seed points and seed points which represent liver seed points can be deleted or additionally input, respectively. Once the user has corrected the seed points, a new segmentation of the image data can be carried out with the aid of the Random Walker method. These steps can be repeated until satisfactory results are achieved. No complete recalculation is necessary.

Once the user has altered the seed point information, the Random Walker method can be started again and calculate an improved segmentation. To reduce the calculation time, the preceding solution of the linear equations of the Random Walker method can be used for initializing the subsequent calculation. This is possible since the solution is already correct for most of the pixels. Using this approach, the time for interaction with the user can be reduced.

Applying the techniques described makes it possible to generate a robust liver segmentation. Only a few assumptions about the shape and size of the liver are used. It is possible, therefore, to achieve a good segmentation even in the case of unusual liver shapes and sizes. Slight differences in signal values which are produced, for example, by a liver tumor do not adversely affect the segmentation results. In addition, perfusion computer tomographies can be segmented taking into consideration all of the image information.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for segmenting image data for detecting a liver of a subject under examination, wherein the image data include a number of pixels, each pixel including one signal value allocated thereto, the method comprising:
   determining, as rib pixels, pixels which represent a rib of the subject under examination;
   determining pixels which delimit an area inside a rib cage of the subject under examination, with the aid of the determined rib pixels;
   determining at least one pixel which represents a pixel of the liver of the subject under examination as a liver pixel, within pixels which are located in an area inside the rib cage;
   defining, as background seed points, the determined rib pixels and the determined pixels which delimit the area inside the rib cage;
   defining, as liver seed points, the at least one determined liver pixel; and
   determining a probability, for each pixel of an area inside the rib cage, as to whether the pixel belongs to the liver or not, with the aid of a Random Walker method, with the aid of the defined liver seed points and with the aid of the defined background seed points.

2. The method as claimed in claim 1, wherein the image data include a number of image data layers which are arranged in anatomical order of the subject under examination,
   wherein the determining of pixels which represent a rib is carried out separately for various layers of the image data.

3. The method as claimed in claim 1, wherein the determining of pixels which represent a rib also includes:
   determining pixels which are located inside the subject under examination and pixels which are located outside the subject under examination in order to determine a first boundary which represents a skin surface of the subject under examination;
   determining pixels which are located inside a fatty tissue and the skin surface of the subject under examination and pixels which are located inside a muscle tissue under the fatty tissue of the subject under examination in order to determine a second boundary between the fatty tissue and the muscle tissue on the basis of the first boundary; and
   determining pixels which represent a rib in only one area which extends from the second boundary towards a center of the subject under examination.

4. The method as claimed in claim 3, wherein the area which extends from the second boundary towards the center of the subject under examination is selected in dependence on the location of the pixels.

5. The method as claimed in claim 1, wherein the determining of pixels which delimit the area inside the rib cage includes a joining of the rib pixels by way of a continuous line, wherein pixels which are located on the continuous line are defined as background seed points.

6. The method as claimed in claim 1, further comprising:
   determining individual ribs by combining coherent pixels which belong to precisely one rib, and determining a center of each individual rib and determining a pixel for each individual rib which corresponds to the center of the rib, as rib center.

7. The method as claimed in claim 6, wherein the determining of pixels which delimit an area inside the rib cage includes a joining of the rib centers by way of a spline interpolation, wherein pixels which are located on the spline interpolation are defined as background seed points.

8. The method as claimed in claim 1, wherein a signal value histogram of the signal values of the pixels which are located inside the rib cage is determined and
   wherein pixels with a signal value within a first variance of a first maximum of the signal value histogram are defined as background seed points and pixels with a signal value within a second variance of a second maximum of the signal value histogram are defined as liver seed points.

9. The method as claimed in claim 1, wherein the determination with the aid of the Random Walker method includes a first coarse determination on the basis of image data of a first resolution which has a coarser resolution than the original resolution and a second fine determination on the basis of the results of the first coarse determination and image data in the original resolution.

10. The method as claimed in claim 9, wherein, for the second fine determination, pixels for which a minimum probability for belonging to the liver was determined in the first determination, are used as additional liver seed points.

11. The method as claimed in claim 9, wherein, for the second fine determination, pixels for which a minimum probability for belonging to the background was determined in the first determination, are used as additional background seed points.

12. The method as claimed in claim 1, wherein the image data include a number of image data layers which are arranged in anatomical order of the subject under examination,
   wherein the pixels of an image data layer are addressed in a system of polar coordinates, and wherein the origin of the system of polar coordinates is arranged approximately in a centroid of the layer of the subject under examination.

13. The method as claimed in claim 1, wherein an edge value function $w_{i,j}$ of the Random Walker method between two adjacent pixels i and j is determined in accordance with the equation $$w_{ij}=e^{-\beta \cdot (\Delta d)^2 \cdot c \cdot n \cdot f(gi-gj)},$$

where n is a scaling value which is selected in dependence on a selected function f and a signal value range of the pixels,
$\Delta d$ is a distance between the pixels i and j,
c is a scaling value which is selected in dependence on a movement of the subject under examination between determinations of the pixels i and j which are temporally offset,
$\beta$ is a normalization factor which is selected in dependence on a contrast range of the image data, and
f is a function for determining the difference between the signal values $g_i$ and $g_j$.

14. The method as claimed in claim 13, wherein the following applies to the function f: $f(g_i-g_j)=|g_i-g_j|$.

15. The method as claimed in claim 13, wherein the following applies to the function f: $f(g_i-g_j)=(g_i-g_j)^2$.

16. The method as claimed in claim 1, wherein the image data include computer tomography data and wherein the signal values include Hounsfield values.

17. The method as claimed in claim 1, wherein pixels which represent at least one of air and other gases are defined as background seed points.

18. The method as claimed in claim 1, wherein pixels which represent bones are defined as background seed points.

19. The method as claimed in claim 1, wherein pixels which represent fat are defined as background seed points.

20. The method as claimed in claim 1, wherein pixels which represent an aorta are defined as background seed points.

21. The method as claimed in claim 1, wherein the image data for each pixel include a number of signal values, wherein the number of signal values are detected successively in time, the method further comprising:
- defining pixel blocks which include a number of pixels which are located in the area inside the rib cage,
- performing a perfusion of the subject under examination during the detection of the number of temporally successive signal values,
- determining a pixel block as a starting pixel block in which the number of pixels which exceed a threshold value rises during the temporally successive signal value detection, and
- defining as liver seed points pixels of the starting pixel block which exceed the threshold value.

22. The method as claimed in claim 21, wherein a pixel block is defined as starting pixel block if the number of pixels which exceed a threshold value rises during the temporally successive signal value detection, and if the number of pixels which exceed a threshold value includes a proportion of the total number of pixels of the pixel block.

23. The method as claimed in claim 22, wherein the proportion includes at least 40%.

24. The method as claimed in claim 21, wherein the method further comprises:
- applying a region growing method to the pixel blocks, wherein the starting pixel block is used as starting point for the region growing method, and
- determining pixel blocks which, according to the region growing method, belong to the starting pixel block and defining as liver seed points pixels which belong to the determined pixel blocks and exceed the threshold value.

25. The method as claimed in claim 1, wherein the liver seed points and the background seed points also have probability information of belonging to the liver or to the background, respectively, wherein the membership probability information is used by the Random Walker method for determining the probability for each pixel of an area inside the rib cage whether the pixel belongs to the liver or not.

26. A device for segmenting image data for detecting a liver of a subject under examination, wherein the image data include a number of pixels, each pixel being allocated one signal value, the device comprising:
- an element for determining as rib pixels, pixels which represent a rib of the subject under examination;
- an element for determining pixels which delimit an area inside a rib cage of the subject under examination, with the aid of the determined rib pixels;
- an element for determining at least one pixel which represents a pixel of the liver as a liver pixel within pixels which are located in the area inside the rib cage;
- an element for defining, as background seed-points, the rib pixels and the pixels which delimit the area inside the rib cage;
- an element for defining as liver seed points the determined at least one liver pixel; and
- an element for determining a probability for each pixel of an area inside the rib cage, of whether the pixel belongs to the liver or not, with the aid of a Random Walker method, with the aid of the defined liver seed points and with the aid of defined the background seed points.

27. A device for segmenting image data for detecting a liver of a subject under examination, wherein the image data include a number of pixels, each pixel being allocated one signal value, the device comprising:
- an element for determining as rib pixels, pixels which represent a rib of the subject under examination;
- an element for determining pixels which delimit an area inside a rib cage of the subject under examination, with the aid of the determined rib pixels;
- an element for determining at least one pixel which represents a pixel of the liver as a liver pixel within pixels which are located in the area inside the rib cage;
- an element for defining, as background seed points, the rib pixels and the pixels which delimit the area inside the rib cage;
- an element for defining as liver seed points the determined at least one liver pixel; and
- an element for determining a probability for each pixel of an area inside the rib cage, of whether the pixel belongs to the liver or not, with the aid of a Random Walker method, with the aid of the defined liver seed points and with the aid of defined the background seed points, wherein the device is designed for carrying out the method as claimed in claim 1.

28. A computer program product which is loadable directly into a memory of a programmable processing unit of a device for segmenting image data, with program segments for carrying out all steps of a method as claimed in claim 1 when the program is executed in the processing unit.

29. An electronically readable data medium with electronically readable control information stored thereon, designed in such a manner that, when the data medium is used in a processing unit of a device for segmenting image data, it carries out the method as claimed in claim 1.

30. The method as claimed in claim 2, wherein the determining of pixels which represent a rib also includes:
- determining pixels which are located inside the subject under examination and pixels which are located outside the subject under examination in order to determine a first boundary which represents a skin surface of the subject under examination;
- determining pixels which are located inside a fatty tissue and the skin surface of the subject under examination and pixels which are located inside a muscle tissue under the fatty tissue of the subject under examination in order to determine a second boundary between the fatty tissue and the muscle tissue on the basis of the first boundary; and
- determining pixels which represent a rib in only one area which extends from the second boundary towards the center of the subject under examination.

31. The method as claimed in claim 10, wherein, for the second fine determination, pixels for which a minimum probability for belonging to the background was determined in the first determination, are used as additional background seed points.

* * * * *